United States Patent
Hoshino et al.

(10) Patent No.: US 10,915,441 B2
(45) Date of Patent: Feb. 9, 2021

(54) STORAGE SYSTEM HAVING NON-VOLATILE MEMORY DEVICE

(71) Applicants: HITACHI, LTD., Tokyo (JP); HITACHI INFORMATION & TELECOMMUNICATION ENGINEERING, LTD., Kanagawa (JP)

(72) Inventors: Koshi Hoshino, Tokyo (JP); Shigeo Homma, Kanagawa (JP); Junji Ogawa, Tokyo (JP); Yoshinori Ohira, Tokyo (JP)

(73) Assignees: HITACHI, LTD., Tokyo (JP); HITACHI INFORMATION & TELECOMMUNICATION ENGINEERING LTD., Kanagawa (JP)

( * ) Notice: Subject to any disclaimer, the term of this patent is extended or adjusted under 35 U.S.C. 154(b) by 0 days.

(21) Appl. No.: 16/495,752

(22) PCT Filed: Aug. 23, 2017

(86) PCT No.: PCT/JP2017/030134
§ 371 (c)(1),
(2) Date: Sep. 19, 2019

(87) PCT Pub. No.: WO2019/038859
PCT Pub. Date: Feb. 28, 2019

(65) Prior Publication Data
US 2020/0097396 A1 Mar. 26, 2020

(51) Int. Cl.
*G06F 12/02* (2006.01)
*G06F 3/06* (2006.01)
*G06F 12/0868* (2016.01)

(52) U.S. Cl.
CPC .......... *G06F 12/0246* (2013.01); *G06F 3/064* (2013.01); *G06F 3/0659* (2013.01); *G06F 3/0679* (2013.01); *G06F 2212/7201* (2013.01)

(58) Field of Classification Search
None
See application file for complete search history.

(56) References Cited

U.S. PATENT DOCUMENTS 8,874,835 B1    10/2014 Davis et al.
10,540,095 B1 *  1/2020 Cheng ..................... G06F 16/13
(Continued)

FOREIGN PATENT DOCUMENTS

JP    2007-004234 A    1/2007
JP    2016-170583 A    9/2016
(Continued)

OTHER PUBLICATIONS

International Search Report dated Sep. 26, 2017 for the PCT International Application No. PCTJP2017/030134.

*Primary Examiner* — Michael Alsip
(74) *Attorney, Agent, or Firm* — Volpe Koenig (57) ABSTRACT

An upper system of an NVM device transmits, to the NVM device, a write command that designates a logical address, the write command being associated with an expiration date corresponding to a data expiration date correlated with write target data. The NVM device correlates an expiration date correlated with the write command with a logical address specified from the write command. The NVM device writes pieces of data of which the remaining time which is the time to an expiration date belongs to the same remaining time range to the same physical storage area among the plurality of physical storage areas. The NVM device erases data from a physical storage area when the expiration dates of all pieces of data in the physical storage area have expired.

9 Claims, 10 Drawing Sheets

(56) References Cited

U.S. PATENT DOCUMENTS

| | | |
|---|---|---|
| 2006/0288153 A1 | 12/2006 | Tanaka et al. |
| 2015/0199268 A1 | 7/2015 | Davis et al. |
| 2016/0170873 A1 | 6/2016 | Uchigaito et al. |
| 2016/0266792 A1 | 9/2016 | Amaki et al. |
| 2017/0017411 A1* | 1/2017 | Choi ................. G06F 3/064 |
| 2017/0153848 A1 | 6/2017 | Martineau et al. |
| 2017/0242625 A1* | 8/2017 | Pandurangan ........ G06F 3/0616 |
| 2019/0042407 A1* | 2/2019 | Gao ................. G06F 3/0619 |
| 2019/0179559 A1* | 6/2019 | Bolkhovitin ........ G06F 12/0253 |

FOREIGN PATENT DOCUMENTS

| | | |
|---|---|---|
| JP | 2017-102908 A | 6/2017 |
| WO | 2015/008358 A1 | 1/2015 |

\* cited by examiner

Address conversion table
300

| LBA | Status | Block number | Page number | Data expiration date | Stripe expiration date |
|---|---|---|---|---|---|
| 0x0000 | Allocated | 1 | 0 | 2017/01/01 00:00 | 2017/02/28 00:00 |
| 0x0010 | Allocated | 2 | 0 | 2017/03/31 17:00 | 2017/03/31 17:00 |
| 0x0020 | I/O suppression | 2 | 1 | 2016/10/10 10:00 | 2017/03/31 17:00 |
| 0x0030 | Allocated | 1 | 1 | 2017/01/01 00:00 | 2017/01/01 00:00 |
| 0x0040 | Not allocated | — | — | — | — |
| ... | ... | ... | ... | ... | ... |

FIG. 4

Block group management table
400

| Group number | Remaining time range | Polling period | Block number list |
|---|---|---|---|
| 1 | ~ 1 (month) | Monthly | 50, 51, ... |
| 2 | 1 (month) ~1 (day) | Daily | 4, 5, ... |
| 3 | 24~1 (hour) | Hourly | 11, 12, ... |
| 4 | 60~0 (min.) | - | 21, 22, ... |

STORAGE SYSTEM HAVING NON-VOLATILE MEMORY DEVICE

TECHNICAL FIELD

The present invention generally relates to storage control in a storage system having non-volatile memory devices.

BACKGROUND ART

A storage system that controls deployment of data in a plurality of different types of NVMs (for example, a plurality of NVMs in which the number of bits per cell are different) is known as a storage system having non-volatile memory devices (NVM devices) (for example, see PTL 1 and 2).

CITATION LIST

Patent Literature

Patent Literature 1: U.S. Pat. No. 8,874,835
Patent Literature 2: US 2015/0199268

SUMMARY OF INVENTION

Technical Problem

Flash memory devices (hereinafter FM devices) are known as NVM devices. An FM device has FM (flash memory). An FM generally includes a plurality of blocks. Each block includes a plurality of pages. Data is read and written in units of page and data is erased in units of block. Moreover, an FM is generally a write-once type memory. Specifically, when a logical area to which pages are allocated is a write destination, newly vacant pages are allocated to a write destination logical area instead of pages which have already been allocated, and data is written to the newly allocated pages. In each logical area, data (that is, latest data) written to a page which has been allocated recently is "valid data", a page to which valid data is written is a "valid page", data stored in a page which was allocated in the past is "invalid data", and a page to which invalid data is written is an "invalid page". Moreover, a page which is not a valid page or an invalid page and in which data can be newly stored is a "vacant page".

An FM device generally performs an internal process including data migration between blocks asynchronous with an I/O process performed in response to an I/O (Input/Output) command from an upper system of a FM device. A reclamation process is an example of an internal process. A "reclamation process" is a process of collecting fragmented valid data in a block in another process and executing an erasure process with respect to a migration source block. In this way, the migration source block can be changed to a vacant block. The number of erasure times (rewritable times) of each block generally has an upper limit.

The larger the number of blocks in which data fragmentation occurs, the larger becomes the amount of data migration in a reclamation process. Therefore, the increasing rate of the number of erasure times of blocks increases, and therefore, the service life of FM shortens. Moreover, since the overhead of a reclamation process increases, the I/O performance of FM devices decreases.

Such a problem may occur in an NVM device other than a FM device (for example, particularly, an NVM device which includes NVMs in which data fragmentation can occur in a physical storage area and in which an internal process including data migration between physical storage areas is performed).

Solution to Problem

An upper system of an NVM device transmits, to the NVM device, a write command that designates a logical address, the write command being associated with an expiration date corresponding to a data expiration date correlated with write target data. The NVM device correlates an expiration date correlated with the write command with a logical address specified from the write command. The NVM device writes pieces of data of which the remaining time which is the time to an expiration date belongs to the same remaining time range to the same physical storage area among the plurality of physical storage areas (the writing may be performed by at least an internal process among a write process corresponding to the write command and an internal process performed asynchronously with the write process). The NVM device erases data from a physical storage area when the expiration dates of all pieces of data in the physical storage area have expired.

Advantageous Effects of Invention

Since pieces of data of which the remaining time belongs to the same remaining time range are written to the same physical storage area, suppression of data fragmentation in the physical storage area is expected. Moreover, since an expiration date based on a data expiration date correlated with write target data is set in an NVM device and a process of monitoring whether the expiration date has expired is off-loaded to the NVM device, the load of an upper system is reduced.

DESCRIPTION OF EMBODIMENTS

In the following description, an "interface unit" includes one or more communication interface devices. One or more communication interface devices may be one or more communication interface devices of the same type (for example, one or more NICs (Network Interface Cards) and may be two or more communication interface devices of different types (for example, a NIC and an HBA (Host Bus Adapter)).

In the following description, a "memory unit" includes one or more memories. At least one memory may be a volatile memory and may be a non-volatile memory. A memory unit is mainly used during processing of a processor unit.

In the following description, a "processor unit" includes one or more processors. At least one processor is typically a microprocessor such as a CPU (Central Processing Unit) . One or more processors may be single cores and may be multi-cores. The processor unit may include a hardware circuit (for example, a parity computation circuit) that performs a part or all of the processes.

Moreover, in the following description, although information is sometimes described using an expression of an "xxx table", the information may be expressed by an arbitrary data structure. That is, the "xxx table" may be referred to as "xxx information" in order to show that information does not depend on a data structure. Moreover, in the following description, the configuration of each table is an example, one table may be divided into two or more tables, and all or a part of two or more tables may be integrated into one table.

In the following description, there may be cases where processing is described using a "program" as the subject. However, a processor unit (or an apparatus or a system including the processor unit) may also be used as the subject of the processing since predetermined processing is performed using a memory unit and/or an interface device as necessary when a program is executed by a processor unit. A program may be installed in an apparatus such as a computer from a program source. The program source may be a program distribution server or a computer-readable (for example, non-transitory) recording medium, for example. Moreover, in the following description, two or more programs may be implemented as one program, and one program may be implemented as two or more programs.

In the following description, "RAID" stands for Redundant Array of Independent (or Inexpensive) Disks.

In the following description, a "RAID group" may be a group that is made up of a plurality of PDEVs and stores data according to a RAID level (RAID configuration) correlated with the RAID group and may be a group that is made up of a plurality of physical storage areas and stores data according to a RAID level (RAID configuration) correlated with the RAID group.

In the following description, a "storage system" includes one or more storage apparatuses. At least one storage apparatus may be a general-purpose physical computer and may be a disc array apparatus having two or more PDEVs. Moreover, at least one storage apparatus may be a virtual storage apparatus and may execute an SDx (Software-Defined anything). As the SDx, an SDS (Software Defined Storage) or an SDDC (Software-defined Datacenter) may be used. For example, an SDS as a storage apparatus and a virtual computer as a client system may be executed on the same computer system.

In the following description, when the same types of elements are distinguished from each other, reference numerals (or identification numbers) of the elements may be used (for example, FMPKs 112A and 112B (or blocks 1 and 2)), and when the same types of elements are not distinguished from each other, only a common number (or reference numeral) in the reference numerals of the elements may be used (for example, FMPK 112 (or block 176)).

In the following description, an FMPK (flash memory package) is used as an example of an NVM device. An FMPK is an example of a FM device. NVMs other than FM instead of FM, for example, PRAM (Phase-change Random Access Memory), MRAM (Magnetoresistive Random Access Memory), ReRAM (Resistive Random Access Memory), or FeRAM (Ferroelectric Random Access Memory) may be used as the NVMs.

Definitions of a plurality of storage areas used in the following description are as follows.

A "RAID area" is a logical storage area provided by a RAID group.

An "FMPK area" is a logical storage area provided by an FMPK. A plurality of FMPK area provided by a plurality of FMPKs form a RAID area.

A "strip" is a portion of an FMPK area. A strip stores user data or a parity.

A "stripe" is a storage area made up of two or more strips (for example, two or more strips of the same logical address) present in two or more FMPK areas of a RAID area. A stripe is the unit of generating a parity.

A "block" is each of a plurality of physical storage areas that form an FM. Data is erased in units of block.

A "page" is each of a plurality of physical storage areas that form a block. Data is read and written in units of page.

In the following description, it is assumed that a strip size is the same as a page size in order to facilitate description. Therefore, data (user data or a parity) written to a strip is written to a page allocated to a logical area as the strip. A strip size may be different from a page size.

Figure 1:
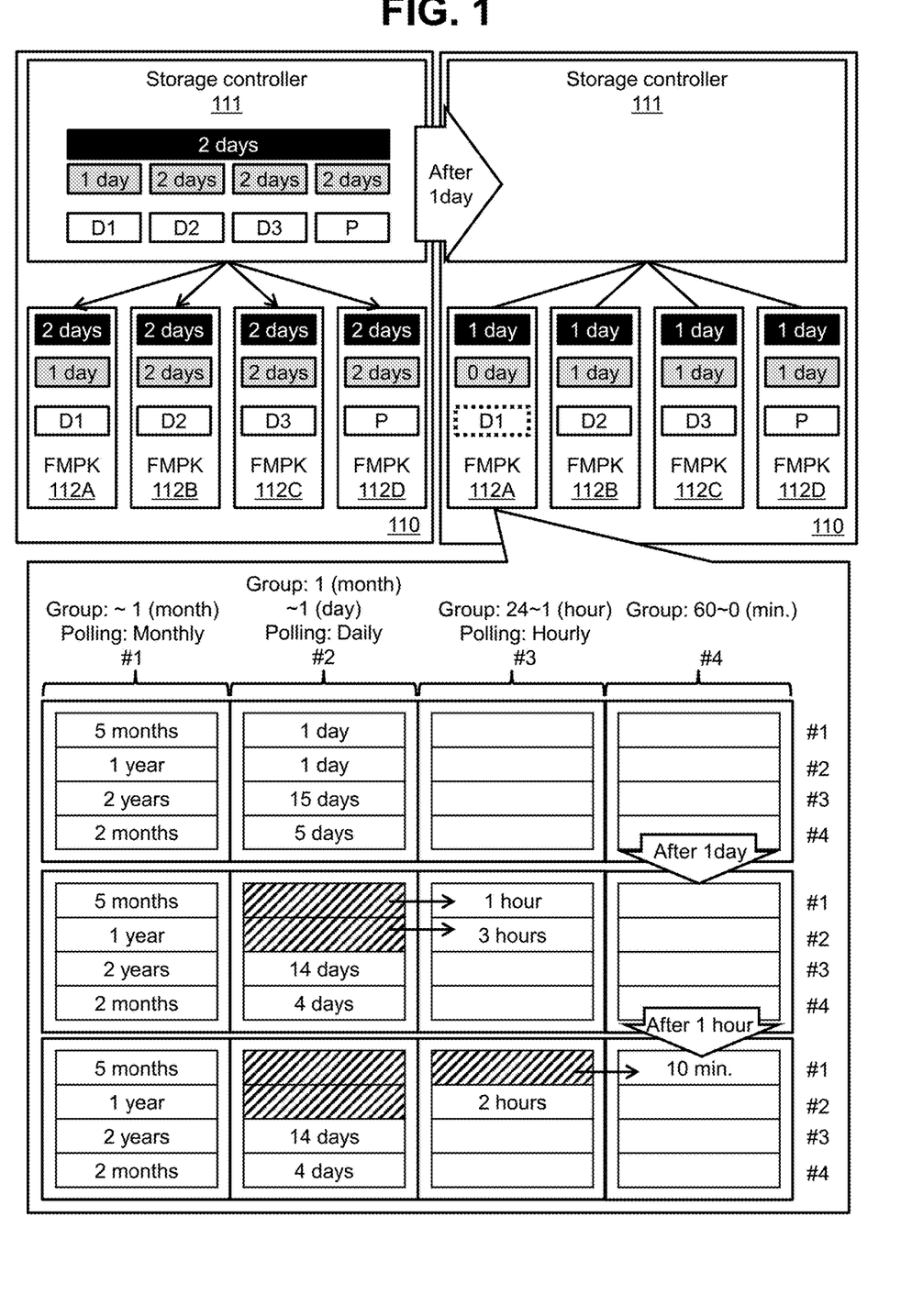
FIG. 1 illustrates the outline of an embodiment.

FIG. 1 illustrates the outline of an embodiment.

A storage system 110 is an object storage system. The storage system 110 stores object data. Object data includes a data body and metadata. Metadata includes information indicating an expiration date (hereinafter, a data expiration date) of a data body.

The storage system 110 includes a plurality of FMPKs 112 (for example, 112A to 112D) and a storage controller 111 that controls input/output of data with respect to the plurality of FMPKs 112. The FMPKs 112A to 112D form a RAID group. The storage controller 111 is an example of an upper system of the FMPKs 112. When a plurality of FMPKs 112 is connected to a client system (one or more computers), the client system may be an upper system of the FMPKs 112.

It is assumed that there are pieces of user data D1 to D3 corresponding to at least a part of the object data. It is assumed that pieces of user data D2 and D3 are data after updating and parity P is a parity after updating. The storage controller 111 performs the following processes.

(S1) The storage controller 111 specifies a data expiration date of "after two days" indicated by metadata in storage target object data.

(S2) The storage controller 111 determines that the data expiration dates of the user data D2 and D3 after updating and the parity after updating are "after two days" (strictly, for example, by 24:00 of the date after two days) (in FIG. 1, the data expiration dates of each data (user data or a parity) are illustrated in gray boxes). This is because the data expiration date specified in S1 is "after two days". The storage controller 111 does not change the data expiration date of "after one day" of the user data D1. This is because, the user data D1 is not updated.

(S3) The storage controller 111 determines that the latest data expiration date of "after two days" among the data expiration dates of the pieces of user data D1 to D3 is a stripe expiration date (in FIG. 1, the stripe expiration date is illustrated in a black box). The "stripe expiration date" is an expiration date of entire stripe data. The "stripe data" is a user data set (data made up of pieces of user data D1, D2, and D3) stored in one stripe among a write target data body.

(S4) The storage controller 111 transmits an instruction (command) designating the stripe expiration date determined in S3, a data expiration date of the user data or parity stored in the FMPKs 112, and a data storage destination logical address (for example, an LBA (Logical Block Address)) corresponding to the dates to the FMPKs 112. The instructions to the FMPKs 112B to 112D which are write destinations of the user data D2 and D3 or the parity after updating are write commands for write target user data or parity after updating. The FMPK 112 having received the instructions correlates, in the FMPK, the stripe expiration date and the data expiration date designated in the instructions with a logical address designated in the instructions. When the instruction is a write command, the FMPK 112 selects a storage destination block of data of which the remaining time belongs to the same remaining time range as a remaining time (a time up to the stripe expiration date correlated with the write command) specified from the write command and writes data (user data or a parity) corresponding to the write command in the block. In this way, it is expected that pieces of data of which the stripe expiration dates expire in the same period are collected in the same block. As a result, it is possible to erase data while suppressing the amount of data migration resulting from variations in the stripe expiration date.

As illustrated in FIG. 1, after one day passes after steps S1 to S4 are performed, the stripe expiration date and the data expiration date are shortened by one day. As a result, the data expiration date of the user data D1 in the FMPK 112A expires (the stripe expiration date does not expire). In this case, although the FMPK 112A manages a storage destination logical address of the user data D1 as an I/O suppression target logical address (see a broken line in FIG. 1), the user data D1 is not deleted.

That is, even if the data expiration date expires, the FMPKs 112 do not delete data (user data or a parity) of which the data expiration date has expired. Therefore, even if the data expiration date of certain data in one stripe expires, updating of a parity corresponding to the stripe is not necessary. As a result, since the overhead decreases, it is possible to expect improvement in performance of the entire storage system 110. Moreover, since the number of writing times with respect to the FMPK 112 decreases, it is possible to expect an extended service life of the FMPK 112. However, reading of I/O suppression target data of which the data expiration date has expired is allowed if the reading is for recovering the parity. Specifically, the FMPK 112 that stores data of which the data expiration date has expired reads the I/O suppression target data and returns the data to the storage controller 111 when a read command satisfying the followings is received from the storage controller 111. Therefore, it is possible to recover the parity corresponding to the I/O suppression target data.

A designated logical address is a logical address correlated with I/O suppression.

Information indicating recovery of a parity is correlated.

When the stripe expiration date has expired, each FMPK 112 deletes data of which the stripe expiration date has expired from the FMPK 112. Specifically, the FMPK 112 performs an erasure process of erasing a block including data of which the stripe expiration date has expired (after a reclamation process is performed if necessary).

Each FMPK 112 monitors a stripe expiration date in the FMPK 112. Specifically, each FMPK 112 measures an elapsed time and updates the stripe expiration date in the FMPK 112 according to the measured elapsed time. Each FMPK 112 collects pieces of data of which the stripe expiration dates are close to each other in the same block. In this way, it is possible to suppress the degree of data fragmentation in FM. As a result, the amount of data migration in the reclamation process is reduced. Therefore, the increasing rate of the number of erasure times of blocks decreases, and therefore, it is possible to expect an extended service life of FM. Moreover, since the overhead of the reclamation process decreases, it is also possible to expect a decrease in suppression of I/O performance of the FMPK 112.

According to a comparative example, the FMPK monitors an I/O frequency (the reception frequency of I/O commands) for respective logical addresses and predicts the data expiration date on the basis of the I/O frequency. The FMPK collects pieces of data of which the predicted data expiration dates are close to each other in the same block and erases data of which the data expiration date has expired. However, since a data expiration date generally depends on a use state on a client side, in a comparative example, it is difficult to predict a data expiration date accurately, and therefore, it is thought that the reliability of suppressing the degree of data fragmentation is not high. Moreover, even if the data expiration date of certain data in the same stripe expires, since the data expiration date of another data has not expired, it may be necessary to update the parity.

In the present embodiment, a stripe expiration date is prepared in addition to the data expiration date. The stripe expiration date is the latest date among a plurality of data expiration dates corresponding to a stripe. Even if a data expiration date expires, data is not erased unless a stripe expiration date expires. Therefore, it is possible to store data in units of stripe by at least the expiration date and to expect improvement in the performance of the entire storage system 110 and an extended service life of the FMPK 112 as described above.

In the present embodiment, in each FMPK 112, a monitoring target stripe expiration date is the expiration date designated from the storage controller 111. The designated stripe expiration date is an expiration date determined on the basis of the data expiration date designated in the metadata of object data, that is, an expiration date determined on the basis of an expiration date determined by a client system (for example, a user of the client system) that reads and writes a data body in the object data. Therefore, it is thought that the accuracy of the stripe expiration date is high, and therefore, it is effective to collect and erase pieces of data on the basis of the expiration date.

The outline of data collection performed by each FMPK in the present embodiment is as illustrated in FIG. 1. Hereinafter, one FMPK 112 will be described as an example.

As a data collection unit, a plurality of stages of block groups based on a remaining time (the length to a stripe expiration date) are managed. That is, the correspondence between a plurality of stages of remaining time ranges and a plurality of stages of block groups is managed in the FMPK 112. A "block group" is one or more blocks. The shorter the remaining time, the lower becomes the stage of the remaining time range.

The shorter the remaining time, the higher becomes the grouping accuracy (the smaller becomes a variation in the remaining time of data collected in the same block). That is, the lower the stage of the remaining time range, the shorter the remaining time range. This is to allow the stripe expiration dates to expire at the same time as much as possible so that data can be erased in units of block. As a result, the remaining time range on the lowermost stage is the shortest.

On the other hand, from the viewpoint of storage efficiency, the longer the remaining time, the lower becomes the grouping accuracy (the more becomes a variation in the remaining time of data collected in the same block). That is, the upper the stage of the remaining time range, the longer becomes the remaining time range. As a result, the remaining time range on the uppermost stage is the longest.

In the illustrated example, there are three types of groups including a long-period group, a mid-period group, and a short-period group. The long-period group is a first stage (uppermost-stage) block group (a remaining time range is one month or longer, and a polling period is one month). The mid-period group is a group other than the long-period group and the short-period group, and specifically, is a second stage block group (a remaining time range is shorter than one month and one day or longer, and a polling period is one day) and a third stage block group (a remaining time range is shorter than 24 hours and one hour or longer, and a polling period is one hour). The short-period group is a fourth stage (lowermost-stage) block group (a remaining time range is shorter than 60 minutes). For blocks belonging to the fourth stage block group, a polling period may be any period belonging to the remaining time range corresponding to the group and polling may not be performed. "No" polling means that data is erased after the elapse of the longest period belonging to the remaining time range corresponding to the group after data is stored in the last page of a block belonging to the group. Data is stored in a block belonging to an upper-stage block group as the remaining time increases, whereas data is stored in a block belonging to a lower-stage block group as the remaining time decreases. Moreover, since the mid-period group is present, it is possible to expect to suppress a variation in the remaining time in the same block and to enhance the storage efficiency.

FIG. 1 illustrates Blocks 1 to 4. It is assumed that Blocks 1 to 4 belong to first to fourth stage block groups, respectively. Moreover, it is assumed that Blocks 1 to 4 have Pages 1 to 4, respectively. Hereinafter, a page m (a page of which the page number of m) in a block n (a block of which the block number (#) is n) will be referred to as "page m(n)". Moreover, in FIG. 1, the time in a page indicates a remaining time of data stored in the page.

The FMPK 112 checks each of Blocks 1 and 2 in which valid data is stored at a polling period corresponding to a block group to which the block belongs to see whether there is data of which the remaining time is outside a remaining time range corresponding to the group. When such data is found (for example, when it is detected that the remaining time of data in Page 1 (2) and Page 2(2) is shorter than one day (24 hours)), the FMPK 112 migrates the data to a block (for example, Block 3) belonging to a group in which the remaining time range is lower by one stage (a migration source page becomes an invalid page as indicated by hatching). When such a process is repeated, pieces of data are finally collected in a block belonging to the fourth stage (lowermost-stage) block group as illustrated in FIG. 1 and are erased in units of block when the stripe expiration date expires.

According to the present embodiment, occurrence of data fragmentation in a block is suppressed. Therefore, it is possible to decrease the amount of data migration in a reclamation process. As a result, the increasing rate of the number of erasure times (updating times) of blocks decreases, and as a result, it is possible to expect an extended service life of FM. Moreover, since the overhead of the reclamation process decreases, it is possible to suppress the decrease in the I/O performance of the FMPK 112.

According to the present embodiment, although a data expiration date is correlated with a data body of object data received by the storage controller 111, a process of monitoring whether the stripe expiration date and the data expiration date based on the data expiration date are set in the FMPK 112 and the expiration date has expired is off-loaded from the storage controller 111 to the FMPK 112. Therefore, the load of the storage controller 111 is reduced.

Hereinafter, the present embodiment will be described in detail.

Figure 2:
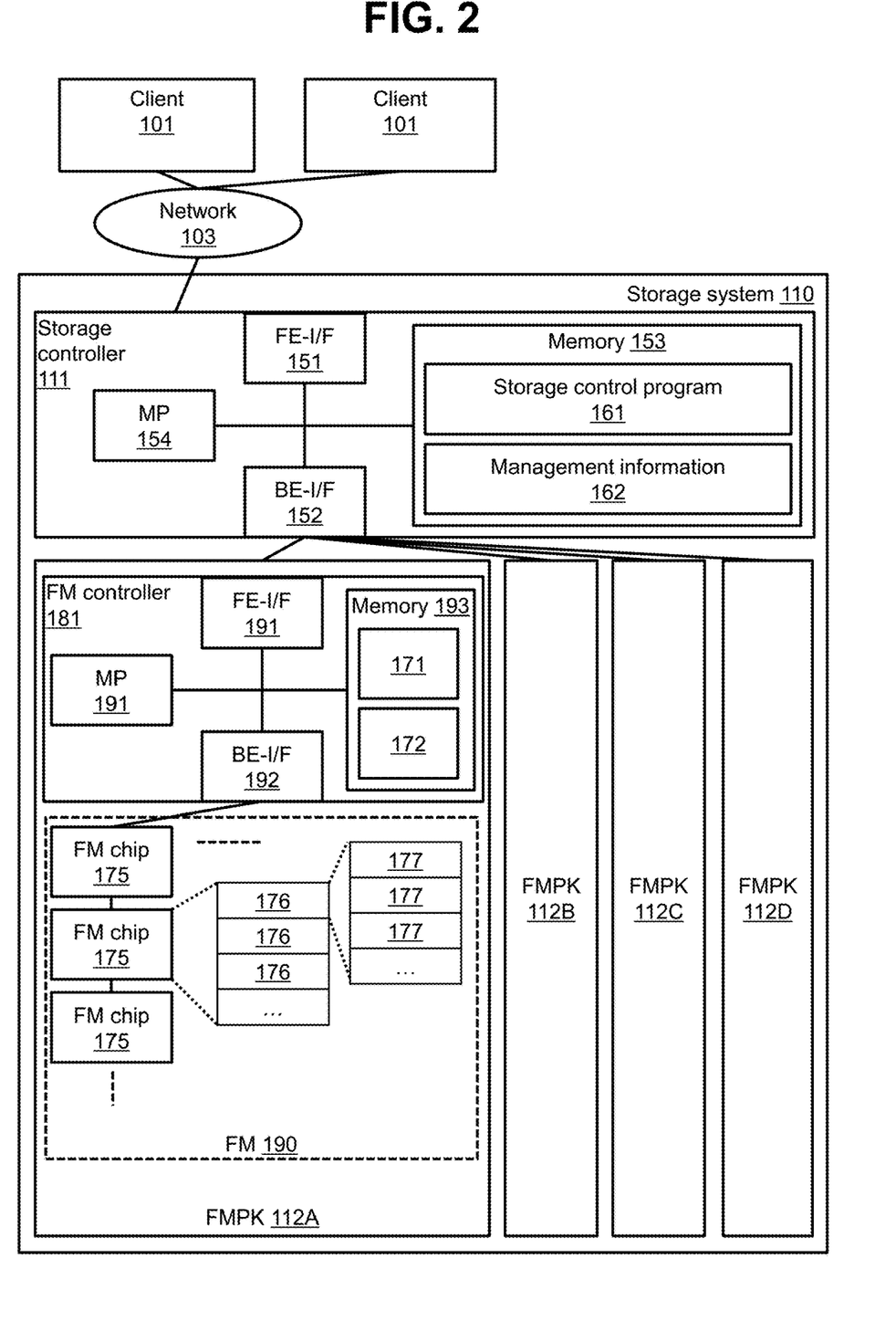
FIG. 2 illustrates a configuration of a storage system according to an embodiment.

FIG. 2 illustrates a configuration of a storage system according to an embodiment.

A client 101 is connected to the storage system 110 via a network 103. The network 103 is an IP (Internet Protocol) network, for example. The client 101 is an example of a host system and is a computer that transmits an I/O (Input/Output) request for object data.

The storage system 110 includes the storage controller 111 and a plurality of FMPKs 112 (for example, 112A to 112D). The plurality of FMPKs 112A to 112D form a RAID group.

The storage controller 111 includes an FE-I/F (frontend interface device) 151, a BE-I/F (backend interface device) 152, a memory 153, and an MP (microprocessor) 154 connected to these components. The FE-I/F 151 and the BE-I/F 152 are examples of an interface unit. The memory 153 is an example of a memory unit. The MP 154 is an example of a processor unit.

The FE-I/F 151 communicates with the client 101. The BE-I/F 152 communicates with the FMPK 112.

The memory 153 stores programs executed by the MP 154 and information used by the MP 154. Examples of the program include a storage control program 161. Examples of the information include management information 162. The storage control program 161 processes I/O requests from the client 101. The management information 162 includes information related to a configuration of the storage system 110. Moreover, the memory 153 includes a cache memory area in which data from the client 101 and data from the FMPK 112 are temporarily stored.

The MP 154 executes programs in the memory 153.

The FMPK 112 includes an FM 190 and a FM controller 181 that controls input/output of data with respect to the FM 190.

The FM 190 is a NAND-type flash memory, for example, and includes one or more FM chips 175. Each FM chip 175 is made up of a plurality of blocks (physical blocks) 176. Each block 176 is made up of a plurality of pages (physical pages) 177. Data is read and written in units of page and data is erased in units of block.

The FM controller 181 includes an FE-I/F 191, a BE-I/F 192, a memory 193, and an MP 191 connected to these components.

The FE-I/F 191 communicates with the storage controller 111. The BE-I/F 192 communicates with the FM 190.

The memory 193 stores programs executed by the MP 191 and information used by the MP 191. Examples of the program include an FM control program 171, for example. Examples of the information include management information 172, for example. The FM control program 171 processes I/O commands from the storage controller 111. The management information 172 includes information related to a configuration of the FMPK 112. Moreover, the memory 193 includes a cache memory area in which data from the storage controller 111 and data from the FM 190 are temporarily stored.

The MP 191 executes programs in the memory 193.

Figure 3:
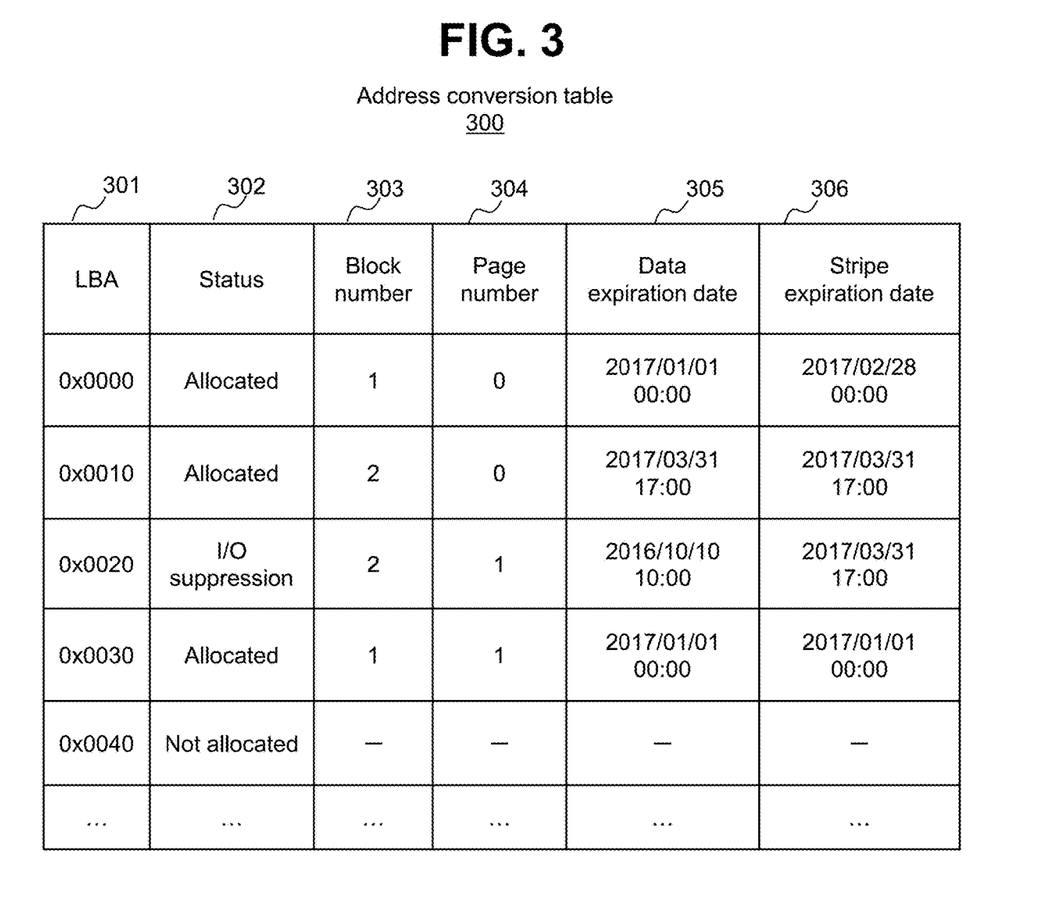
FIG. 3 illustrates a configuration of an address conversion table.

FIG. 3 illustrates a configuration of an address conversion table.

An address conversion table 300 is one of tables included in the management information 172 in the FMPK 112. The address conversion table 300 retains information related to the correspondence between a logical address (LBA) belonging to a FMPK area (a logical storage area) provided by the FMPK 112 and a physical address of the FM 190. Specifically, for example, the address conversion table 300 has entries for each LBA. Each entry stores information including LBA 301, status 302, block number 303, page number 304, data expiration date 305, and stripe expiration date 306. Hereinafter, one LBA (a "target LBA" in description of FIG. 3) will be described as an example.

The LBA 301 indicates a target LBA. The status 302 indicates the status of an area (data) indicated by a target LBA. "Allocated" means that a page (an example of a physical storage area) is allocated to a target LBA. The allocated page is a valid page. "Not allocated" means that a page is not allocated to a target LBA. "I/O suppression" means that a page is allocated to a target LBA and I/O of data in the page is suppressed.

The block number 303 and the page number 304 are examples of a physical address. Specifically, the block number 303 is an identification number of a block having a page allocated to a target LBA. The page number 304 is an identification number of a page allocated to a target LBA.

The data expiration date 305 indicates a data expiration date of data in a page allocated to a target LBA. The stripe expiration date 306 indicates a stripe expiration date of stripe data including user data in a page allocated to a target LBA (or stripe data corresponding to a parity in a page allocated to a target LBA).

Figure 4:
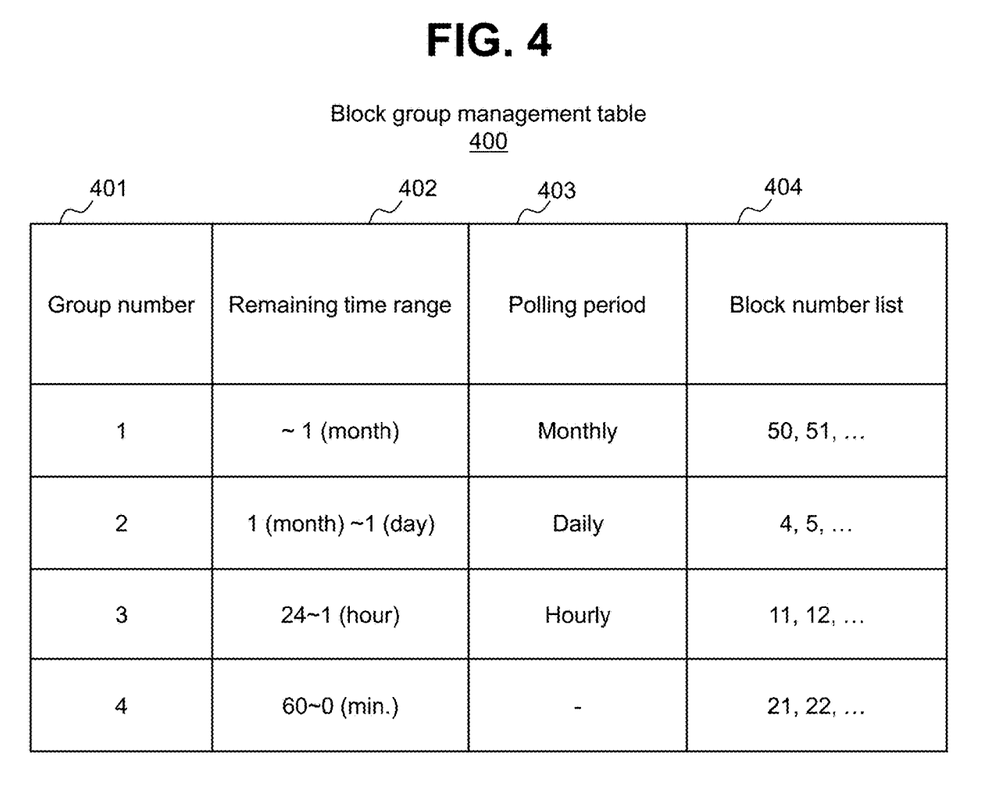
FIG. 4 illustrates a configuration of a block group management table.

FIG. 4 illustrates a configuration of a block group management table.

A block group management table 400 is one of tables included in the management information 172 in the FMPK 112. The block group management table 400 retains information related to each block group. Specifically, for example, the block group management table 400 has entries for each block group. Each entry stores information including group number 401, remaining time range 402, polling period 403, and block number list 404. Hereinafter, one block group (a "target group" in description of FIG. 4) will be described as an example.

The group number 401 is an identification number of a target group. The remaining time range 402 indicates a remaining time range corresponding to a target group. The polling period 403 indicates a period of polling (checking whether data of which the remaining time is outside a remaining time range is present) for a block belonging to a target group. The block number list 404 is a list of identification numbers of blocks belonging to a target group.

Hereinafter, an example of processes performed in the present embodiment will be described.

Figure 5:
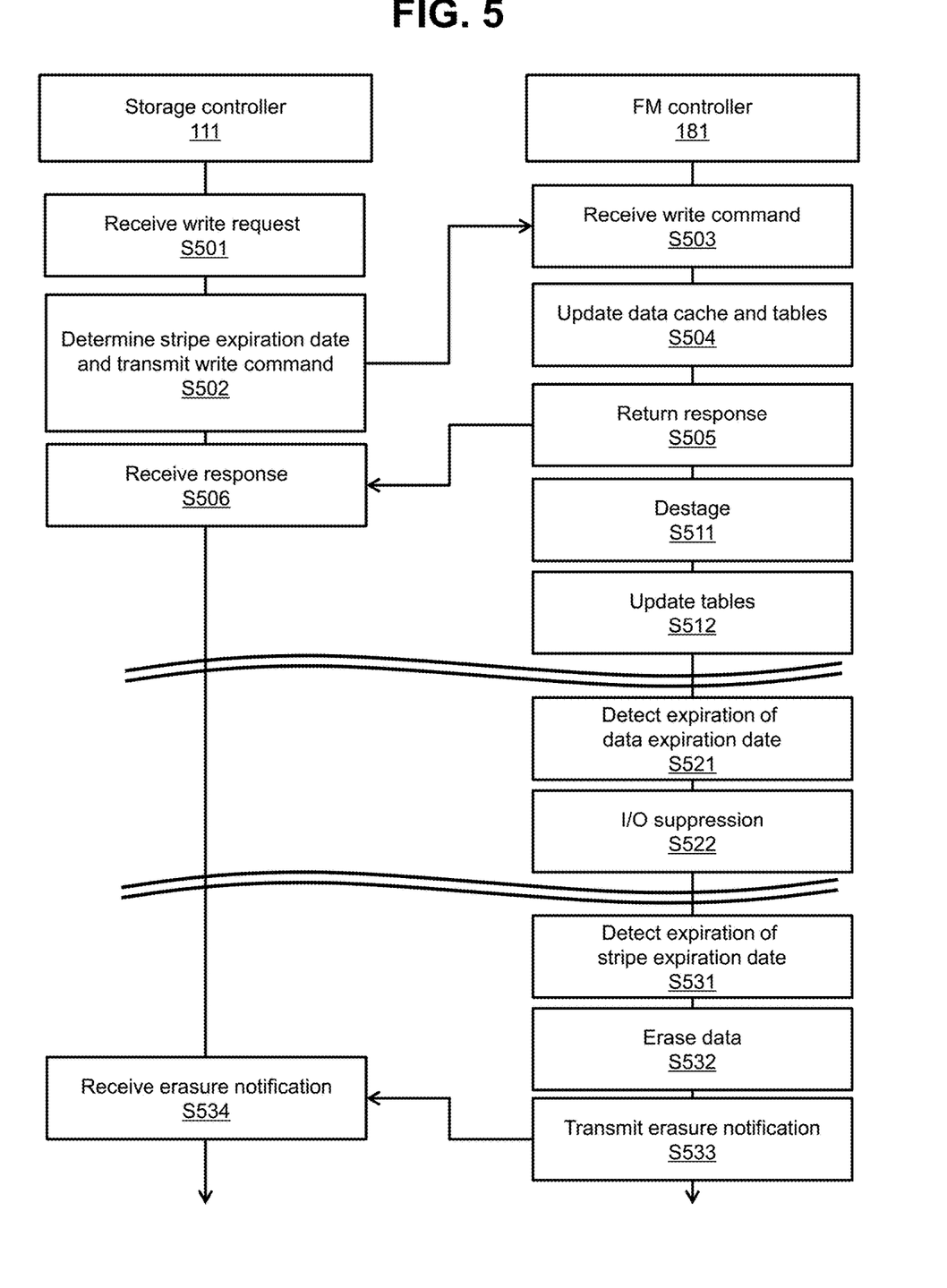
FIG. 5 illustrates the flow of exchange of data between a storage controller and a FM controller.

FIG. 5 illustrates the flow of exchange of data between the storage controller 111 and the FM controller 181.

In S501, the storage controller 111 receives a write request from the client 101.

In S502, the storage controller 111 specifies a data expiration date of a data body in object data from metadata included in the object data corresponding to the write request. The storage controller 111 determines a latest data expiration date among a plurality of data expiration dates corresponding to the stripe data based on the data body as a stripe expiration date. The storage controller 111 transmits a write command with which an LBA, write data, the data expiration date, and the stripe expiration date are correlated to the FMPK 112 . The LBA is an LBA of a write destination area of the write data. The write data is strip data. The "strip data" is a part of the data body and is data stored in a strip, and specifically, is user data or a parity. The data expiration date of a data expiration date of the write data. The stripe expiration date is a determined stripe expiration date.

In S503, the FM controller 181 in the FMPK 112 receives the write command.

In S504, the FM controller 181 stores write data corresponding to the received write command in the cache memory area in the memory 193. Moreover, the FM controller 181 stores the data expiration date and the stripe expiration date designated in the write command in an entry (an entry in the address conversion table 300) including the LBA 301 identical to an LBA designated in the received write command as the data expiration date 305 and the stripe expiration date 306.

In S505, the FM controller 181 returns a completion response of the write command to the storage controller 111. In S506, the storage controller 111 receives the completion response of the write command transmitted in S502 from the FM controller 181.

In S511, when data corresponding to one destage is present in a cache memory area, the FM controller 181 writes (destages) data for respective pages within the data in a page allocated to a write destination LBA. In S512, the FM controller 181 stores the number of a page allocated to the write destination LBA and the number of a block including the page in an entry (an entry in the address conversion table 300) corresponding to the write destination LBA as the page number 304 and the block number 303.

In S521, it is assumed that the FM controller 181 detects data (LBA) of which the data expiration date has expired by polling. In this case, in S522, the FM controller 181 stores the status 302 of "I/O suppression" in the entry (the entry in the address conversion table 300) corresponding to the LBA. The I/O for the LBA corresponding to the "I/O suppression" is suppressed.

In S531, it is assumed that the FM controller 181 detects data (LBA) of which the stripe expiration date has expired by polling. When the stripe expiration dates of all pieces of data in the block where the data is stored have expired, the FM controller 181 erases the data in S532. In S533, the FM controller 181 erases the data. In S534, an erasure notification (an erasure notification correlated with LBAs of respective pieces of erased data) is transmitted to the storage controller 111. In S534, the storage controller 111 receives the erasure notification.

Figure 6:
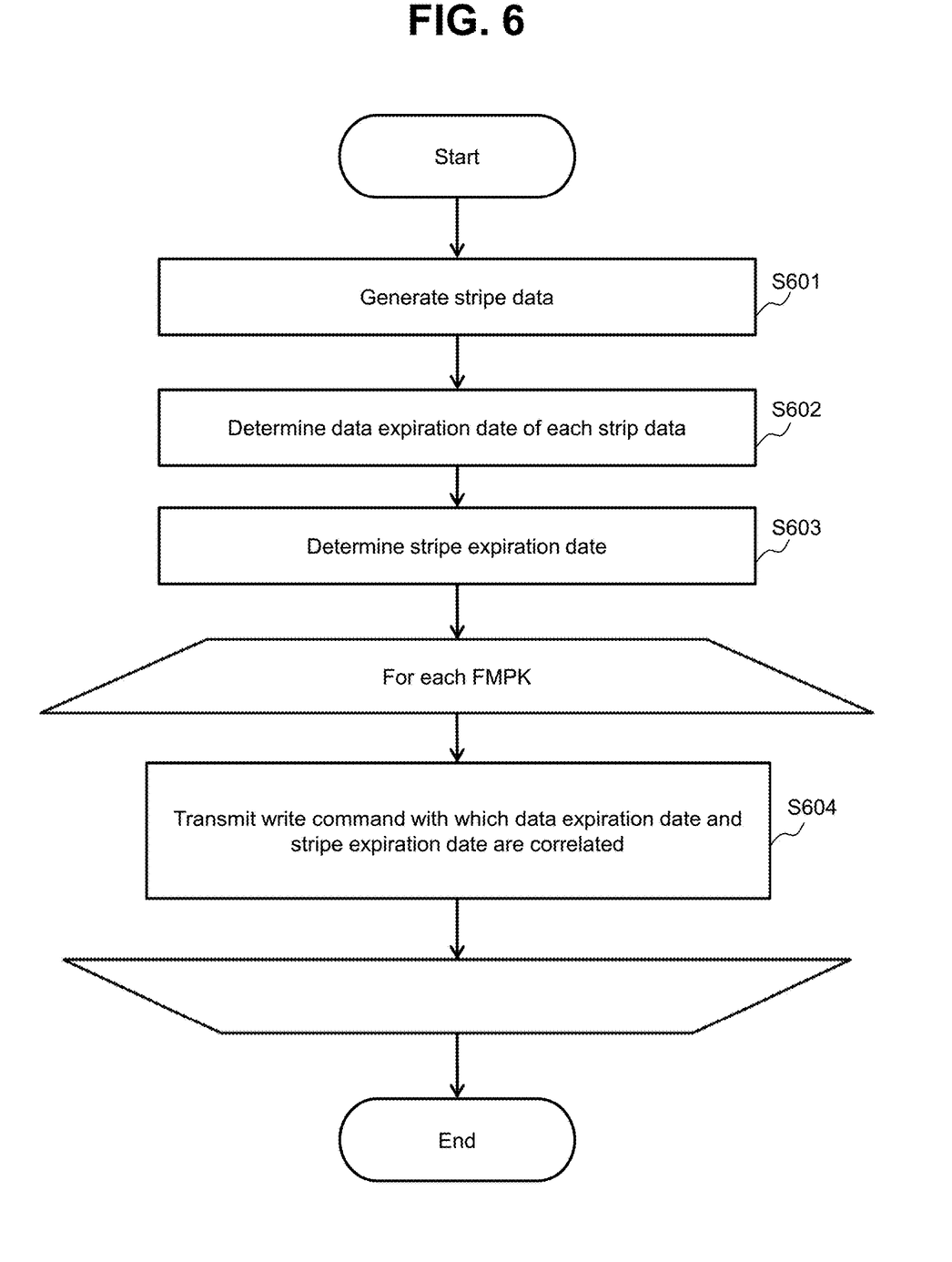
FIG. 6 illustrates the flow of a write process performed when a storage controller receives a write request.

FIG. 6 illustrates the flow of a write process performed when the storage controller 111 receives a write request.

In S601, the storage control program 161 generates stripe data on the basis of a data body in object data corresponding to the received write request.

In S602, the storage control program 161 determines the data expiration dates of respective pieces of strip data by referring to the metadata in the object data. "Strip data" is each user data in the stripe data generated in S602 or a parity corresponding to the stripe data.

In S603, the storage control program 161 determines a latest data expiration date among the data expiration dates determined in S602 as a stripe expiration date.

The storage control program 161 performs S604 for each FMPK 112 that forms a storage destination RAID group of the stripe data. That is, the storage control program 161 transmits a write command (a write command that designates a write destination LBA and uses the user data in the stripe data or a parity corresponding to the stripe data as a write target) with which the data expiration date determined in S602 and the stripe expiration date determined in S603 are correlated to the FMPK 112.

Figure 7:
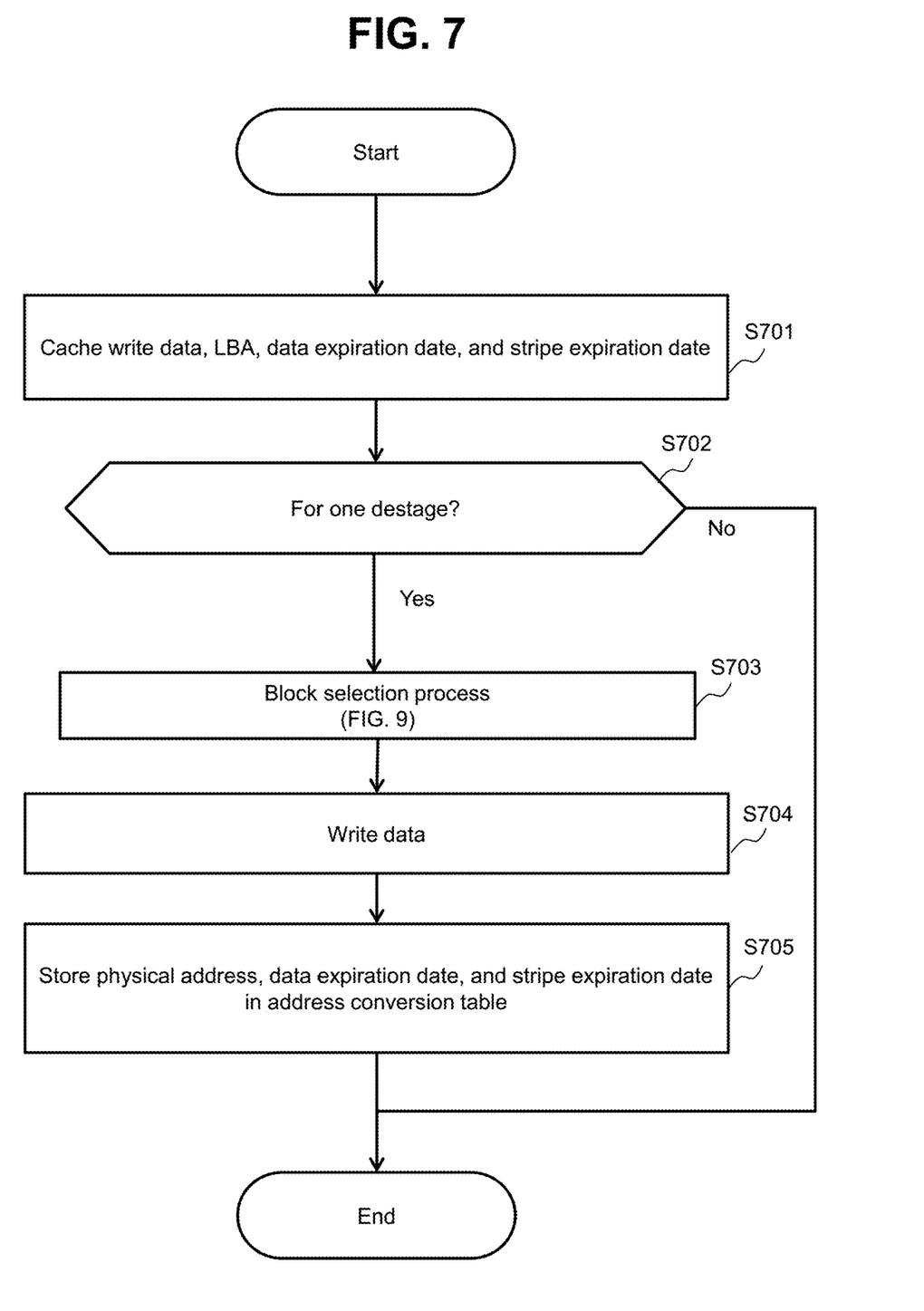
FIG. 7 illustrates the flow of a write process performed when a FM controller receives a write command.

FIG. 7 illustrates the flow of a write process performed when the FM controller 181 receives a write command.

In S701, the FM control program 171 stores the LBA, the write data, the data expiration date, and the stripe expiration date designated in the received write command in a cache memory area.

In S702, the FM control program 171 determines whether write data (dirty data) corresponding to one destage is present in the cache memory area. The "write data corresponding to one destage" is data corresponding to a page in the present embodiment, and may be data of a different unit such as data corresponding to a block or data corresponding to an internal stripe. The "internal stripe" is a stripe in a RAID area provided by a RAID group (for example, a RAID group made up of a plurality of blocks or a plurality of FM chips) that is formed in the FMPK 112.

When a determination result in S702 is true, the FM control program 171 performs a block selection process in S703. In S704, the FM control program 171 writes data in a vacant page in a block selected in S703. In S705, the FM control program 171 stores a physical address (the number of a page allocated to the LBA and the number of a block including the page) and the data expiration date and the stripe expiration date in the entry including the LBA 301 identical to the write destination LBA.

Figure 8:
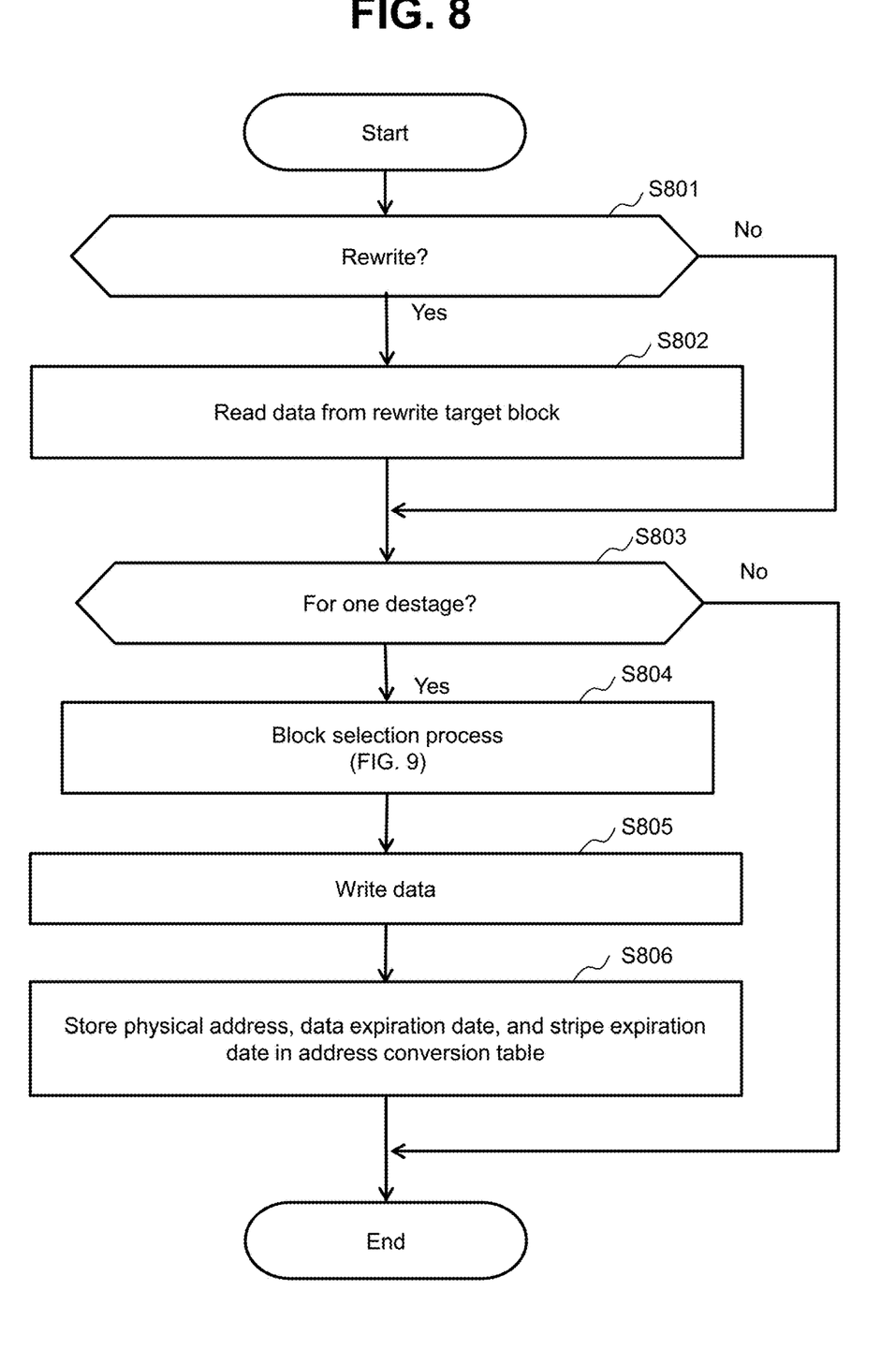
FIG. 8 illustrates the flow of a rewrite process.

FIG. 8 illustrates the flow of a rewrite process.

Inside the FMPK 112, a data migration internal process such as a refresh process and a reclamation process are performed on the background (asynchronously with a write process performed when a write command from the storage controller 111 is received). Rewriting of data occurs in association with the data migration internal process. The refresh process is a process performed due to data retention properties of the FM 190 and is a process of periodically migrating data from a block to another block (after correcting errors) in order to retain data so as to be able to correct errors. The reclamation process is a process performed due to a difference between a writing unit (pages) and an erasing unit (blocks) of the FM 190 and is a process of migrating valid data only to another block and erase data from a migration source block in order to reuse the block.

In S801, the FM control program 171 reads valid data from a write target block (a migration source block) into a cache memory area.

In S802, the FM control program 171 determines whether valid data corresponding to one destage is present in a cache memory area.

When a determination result in S802 is true, the FM control program 171 performs a block selection process in S803. In S804, the FM control program 171 writes data in a vacant page in the block selected in S803. In S805, the FM control program 171 stores a physical address (the number of a page allocated to the LBA and the number of a block including the page) and the data expiration date and the stripe expiration date of the migration target data in an entry including the LBA 301 identical to the write destination LBA.

Figure 9:
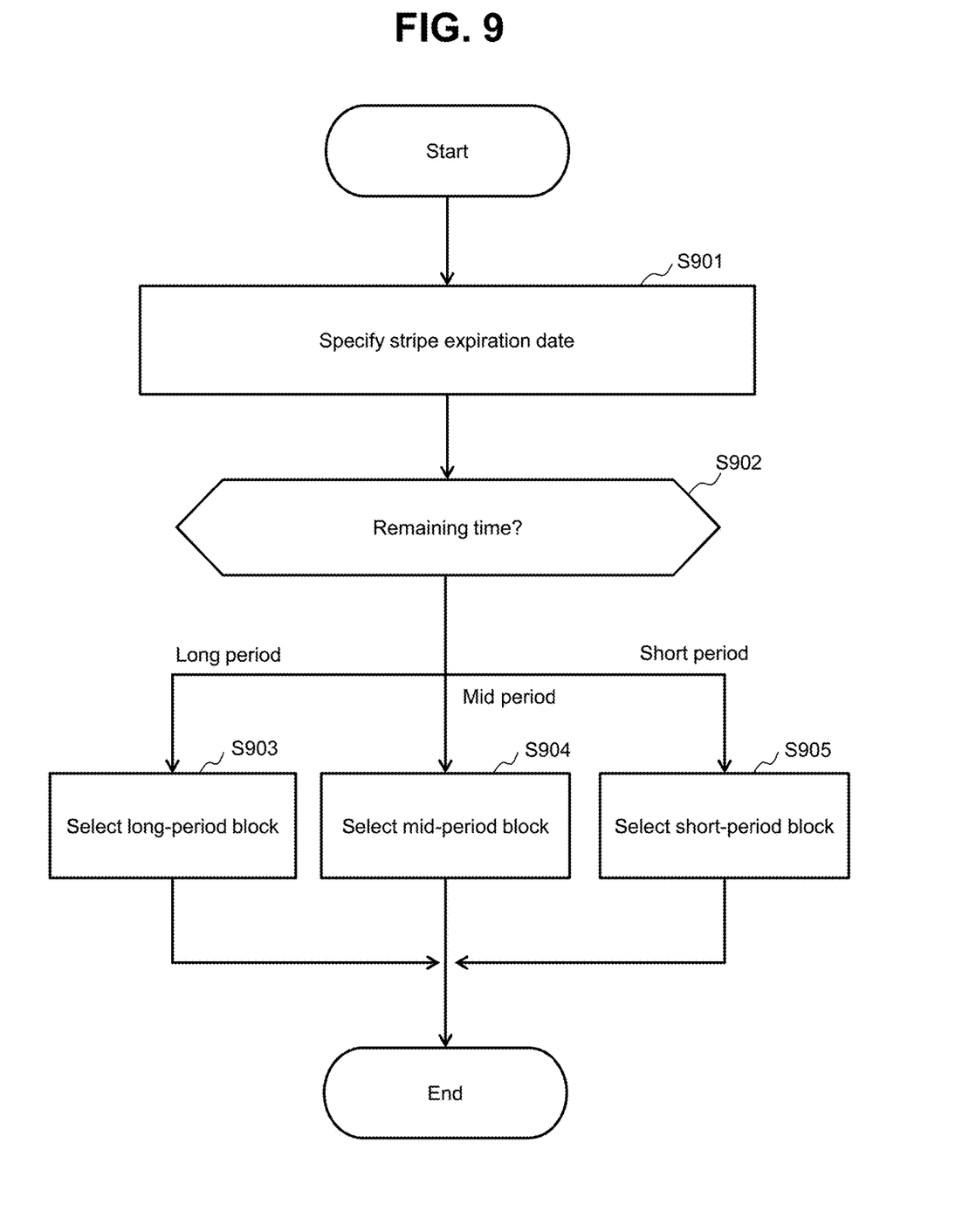
FIG. 9 illustrates the flow of a block selection process.

FIG. 9 illustrates the flow of a block selection process.

In S901, the FM control program 171 specifies a stripe expiration date of destage data (destage target data) from the address conversion table 300.

In S902, the FM control program 171 determines a remaining time range to which the time (remaining time) up to the stripe expiration date specified in S901 belongs among the remaining time ranges 402 stored in the block group management table 400.

When the remaining time belongs to a long period (the uppermost-stage remaining time range), the FM control program 171 selects a long-period block which is a block belonging to the long-period group (the first stage block group) in S903.

When the remaining time belongs to a short period (the lowermost-stage remaining time range), the FM control program 171 selects a short-period block which is a block belonging to the short-period group (the fourth stage block group) in S905.

When the remaining time belongs to a mid period (a block group other than the uppermost and lowermost-stage block groups), the FM control program 171 selects a mid-period block which is a block belonging to the mid-period group in S904. In the present embodiment, although the second and third-stage block groups are provided as the mid-period group, the stage of a group to which a block belongs is determined depending on the stage of a remaining time range to which the remaining time belongs.

In this way, pieces of data of which the stripe expiration dates are close to each other (pieces of data of which the remaining time belongs to the remaining time range of the same stage) are stored in the same block.

Since the block selection process is performed in a write process performed in response to a write command, during destaging of data according to the write command, the data can be collected in the same block corresponding to the remaining time range in which the remaining time is the same. As a result, it is possible to expect that the amount of data migration in the reclamation process is reduced.

Figure 10:
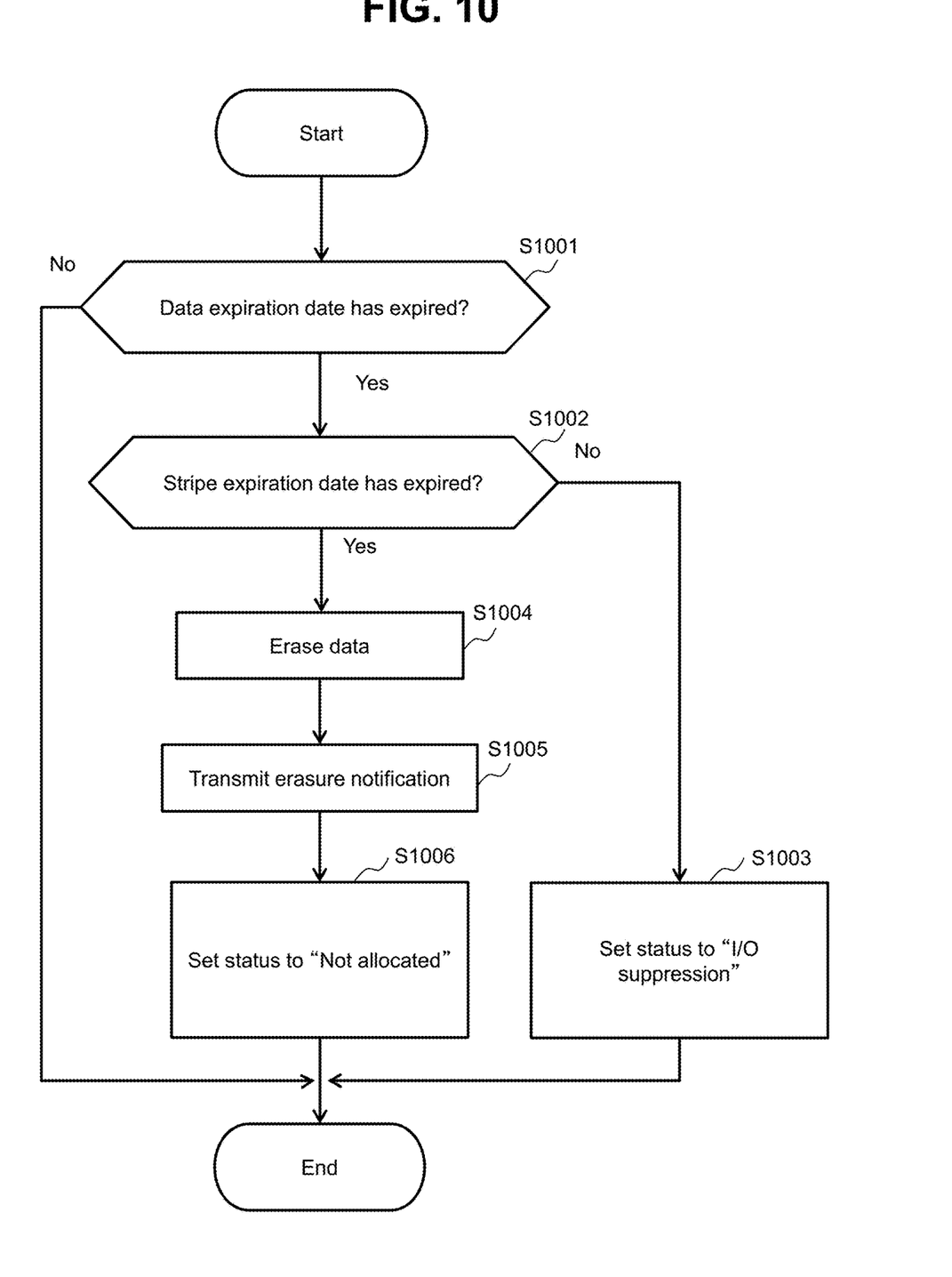
FIG. 10 illustrates the flow of a data control process.

FIG. 10 illustrates the flow of a data control process. The data control process is performed, for example, at a timing corresponding to the polling period corresponding to the block group to which each block belongs (or, for example, a timing at which the block is accessed due to a certain reason). Hereinafter, one page (a "target page" in description of FIG. 10) in one block will be described as an example.

In S1001, the FM control program 171 determines whether a data expiration date corresponding to an allocation destination LBA of a target page has expired by referring to the address conversion table 300.

When the determination result in S1001 is true, the FM control program 171 determines whether a stripe expiration date corresponding to the allocation destination LBA of the target page has expired by referring to the address conversion table 300 in S1002.

When the determination result in S1002 is false, the FM control program 171 sets the status 302 of the allocation destination LBA of the target page to "I/O suppression" in S1003.

When the determination result in S1002 is true (when the stripe expiration dates corresponding to all pages that form a block including the target page have expired), the FM control program 171 erases data from the block including the target page in S1004. In S1005, the FM control program 171 transmits an erasure notification (an erasure notification correlated with an LBA correlated with a block from which data has been erased) to the storage controller 111. In S1006, the FM control program 171 sets the statuses 302 of all LBAs corresponding to the block including the target page to "Not allocated". The page of which the status 302 is "Not allocated" is a vacant page.

The above-described embodiment is an example for describing the present invention, and the scope of the present invention is not limited to the embodiment only. An ordinary person in the art can implement the present invention in various other aspects without departing from the spirit of the present invention.

For example, the FMPK 112 may be connected to a computer such as the client 101, and in that case, the upper system of the FMPK 112 may be a computer such as the client 101.

Moreover, for example, the storage system 110 is not limited to an object storage system. Specifically, for example, it can be expected that the present invention is applied to an overall storage system that receives a data body (for example, file data) correlated with information indicating an expiration date of data as a write target.

Moreover, for example, the management information 172 in each FMPK 112 may include a block management table. The block management table may include information indicating the number of erasure times of each block. The FM controller 181 may determine a stage of a block group to which a block belongs on the basis of a plurality of stages of remaining time ranges and the number of erasure times of the block. For example, a block in which the number of erasure times is relatively large may belong to a relative upper stage block group, and a block in which the number of erasure times is relatively small may belong to a relatively lower stage block group.

REFERENCE SIGNS LIST

110 Storage system

The invention claimed is:

1. A storage system comprising:
an NVM device which has NVMs (non-volatile memories) including a plurality of physical storage areas and which provides a logical storage area, performs an internal process including data migration between physical storage areas, and erases data in units of physical storage area; and
an upper system of the NVM device, wherein
the upper system is configured to transmit a write command that designates a logical address to the NVM device, the write command being associated with a stripe expiration date corresponding to a data expiration date correlated with write target data of which stripe data is based on;
the stripe data is part of at least one of the units of physical storage data, stored in a strip and corresponds to the data expiration date;
each of a plurality of stripe expiration dates corresponds to each of the units of physical storage data, and
the NVM device is configured to:
correlate the stripe expiration date with the logical address specified from the write command;
write pieces of data containing a remaining time in the data expiration date to one of the plurality of physical storage areas, the one of the plurality of physical storage areas is selected based on which of the plurality of physical storage areas has a remaining time range that belongs to the same remaining time range that contains the remaining time of the pieces of data to be written; and
erase data from one of the plurality of physical storage areas when the data expiration date of each of the pieces of data in the one of the plurality of physical storage areas have expired and the stripe expiration date of the one of the plurality of physical storage areas has expired.

2. The storage system according to claim 1, wherein
the storage system includes a plurality of NVM devices which form a RAID (Redundant Array of Independent (or Inexpensive) Disks) group and each of which is the NVM device,
the RAID group is configured to provide a RAID area which is a logical storage area made up of a plurality of stripes,
the logical storage area provided by each of the plurality of NVM devices is made up of a plurality of strips,
each of the plurality of stripes is made up of a plurality of strips provided by each of the plurality of NVM devices,
the upper system is configured to determine, as the stripe expiration date, correlated with the write command transmitted by the upper system, that a latest data expiration date among the data expiration dates of all pieces of strip data that form stripe data based on the write target data is a stripe expiration date which is an expiration date of all of the stripe data, and
the data expiration date of each piece of the strip data is a data expiration date correlated with the write target data corresponding to the strip data.

3. The storage system according to claim 2, wherein
the write command is correlated with a data expiration date and the stripe expiration date corresponding to the strip data corresponding to the write command,
the NVM device having received the write command is configured to correlate the data expiration date and the stripe expiration date correlated with the write command with a logical address specified from the write command, and
each of the plurality of NVM devices is configured to suppress I/O (Input/Output) of data with respect to a logical address in which a stripe expiration date has not expired even if a data expiration date has expired.

4. The storage system according to claim 3, wherein
each of the plurality of NVM devices is configured to read strip data of which a write destination is a logical address corresponding to I/O suppression when recovering a parity corresponding to the strip data even if the logical address corresponds to I/O suppression.

5. The storage system according to claim 1, wherein
the NVM device is configured to manage a plurality of physical storage area groups corresponding to a plurality of stages of remaining time ranges configured such that, the shorter the remaining time, the lower the stage of remaining time range,
one or more physical storage areas belong to each of the plurality of physical storage area groups, and
a lowermost-stage remaining time range which is a remaining time range to which a shortest remaining time belong among the plurality of stages of remaining time ranges is a shortest range.

6. The storage system according to claim 5, wherein
the lower the stage of remaining time range, the shorter becomes the remaining time range, and
the plurality of stages of remaining time ranges include a remaining time range other than an uppermost-stage remaining time range and a lowermost-stage remaining time range.

7. The storage system according to claim 1, wherein
the NVM device is configured to write data corresponding to the write command to a physical storage area in which the remaining time specified from the write command belongs to the same remaining time range among the plurality of physical storage areas.

8. An NVM (non-volatile memory) device connected to an upper system, comprising:

NVMs including a plurality of physical storage areas; and
an NVM controller which is a controller which provides a logical storage area, performs an internal process including data migration between physical storage areas, and erases data in units of physical storage area, wherein the NVM controller is configured to:
receive, from the upper system, a write command that designates a logical address, the write command being associated with a stripe expiration date corresponding to a data expiration date correlated with write target data of which stripe data is based on;
correlate the stripe expiration date with the logical address specified from the write command;
write pieces of data containing a remaining time in the data expiration date to one of the plurality of physical storage areas, the one of the plurality of physical storage areas is selected based on which of the plurality of physical storage areas has a remaining time range that belongs to the same remaining time range that contains the remaining time of the pieces of data to be written; and
erase data from one of the plurality of physical storage areas when the data expiration dates of each of the pieces of data in the plurality of physical storage areas have expired and the stripe expiration date of the one of the plurality of physical storage area has expired, the stripe data is part of at least one of the units of physical storage data, stored in a strip and corresponds to the data expiration date, and each of a plurality of stripe expiration dates corresponds to each of the units of physical storage data.

9. A non-transitory computer-readable medium storing a program for causing a non-transitory computer-readable medium to operate as an upper system of an NVM device which has NVMs (non-volatile memories) including a plurality of physical storage areas and which provides a logical storage area, performs an internal process including data migration between physical storage areas, and erases data in units of physical storage area, the program causes the upper system of an NVM device:

specify a data expiration date correlated with write target data;
transmit a write command that designates a logical address to the NVM device, the write command being associated with a stripe expiration date corresponding to the data expiration date correlated with a write target data of which stripe data is based on;
correlate the stripe expiration date correlated with the write command with the logical address specified from the write command;
write pieces of data containing a remaining time in the data expiration date to one of the plurality of physical storage areas, the one of the plurality of physical storage areas is selected based on which of the plurality of physical storage areas has a remaining time range that belongs to the same remaining time range that contains the remaining time of the pieces of data to be written; and
erase data from one of the plurality of physical storage areas when the data expiration date of each of the pieces of data in the one of the plurality of physical storage areas have expired and the stripe expiration date of the one of the plurality of physical storage areas has expired, wherein the stripe data is part of at least one of the units of physical storage data, stored in a strip and corresponds to the data expiration date, and wherein each of a plurality of stripe expiration dates corresponds to each of the units of physical storage data.

* * * * *